US012677194B2

(12) United States Patent
Aydin

(10) Patent No.: US 12,677,194 B2
(45) Date of Patent: Jul. 7, 2026

(54) METHOD FOR COMMUNICATION OF AT LEAST ONE MOBILE DEVICE WITH A MOBILE NETWORK BASE STATION, AND VEHICLE

(71) Applicant: MERCEDES-BENZ GROUP AG, Stuttgart (DE)

(72) Inventor: Osman Aydin, Leinfelden-Echterdingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 335 days.

(21) Appl. No.: 18/570,171

(22) PCT Filed: May 25, 2022

(86) PCT No.: PCT/EP2022/064321
§ 371 (c)(1),
(2) Date: Dec. 14, 2023

(87) PCT Pub. No.: WO2022/263140
PCT Pub. Date: Dec. 22, 2022

(65) Prior Publication Data
US 2024/0284261 A1      Aug. 22, 2024

(30) Foreign Application Priority Data
Jun. 15, 2021      (DE) ..................... 10 2021 003 076.1

(51) Int. Cl.
*H04W 28/18*      (2009.01)
*H04L 1/00*      (2006.01)
(Continued)

(52) U.S. Cl.
CPC ........... *H04W 28/18* (2013.01); *H04L 1/0015* (2013.01); *H04W 36/06* (2013.01); *H04W 36/302* (2023.05)

(58) Field of Classification Search
CPC ... H04W 28/18; H04W 36/06; H04W 36/302; H04W 12/06; H04L 1/0015; H04L 1/0025; Y02D 30/70; G06N 20/00
See application file for complete search history.

(56) References Cited

U.S. PATENT DOCUMENTS

2020/0160394 A1*   5/2020   Obara .................... G07C 5/008
2023/0112099 A1*   4/2023   Lei ........................ H04L 1/1816
370/329

FOREIGN PATENT DOCUMENTS

WO        2017082801 A1      5/2017
WO        2018063485 A1      4/2018
(Continued)

OTHER PUBLICATIONS

Office Action dated Sep. 27, 2024 in related/corresponding EP Application No. 2273357.0.
(Continued)

*Primary Examiner* — Charles C Jiang
(74) *Attorney, Agent, or Firm* — PATENT PORTFOLIO BUILDERS PLLC

(57) ABSTRACT

A method for communication between a mobile device and a mobile network base station in which a subset of information exchanged between the mobile device and the mobile network base station is communicated using coverage enhancement. If there is a demand situation, the mobile device activates a coverage enhancement mode, in which the mobile device exchanges information with the mobile network base station using coverage enhancement, and, in a normal situation which differs from the demand situation, the mobile device ends the coverage enhancement mode.

8 Claims, 1 Drawing Sheet

Figure 1:
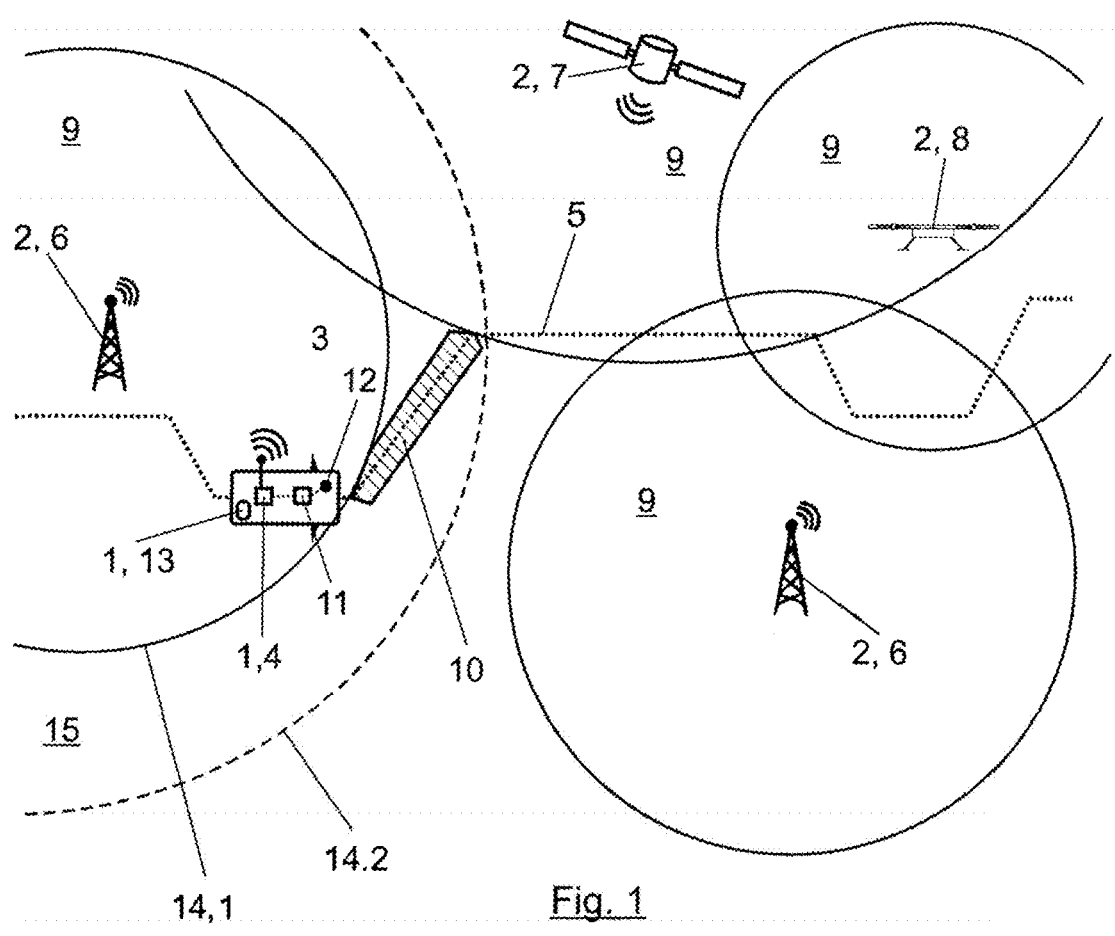

(51) Int. Cl.
H04W 36/06 (2009.01)
H04W 36/30 (2009.01)

(56) References Cited

FOREIGN PATENT DOCUMENTS

| | | | |
|---|---|---|---|
| WO | 2018213166 | A1 | 11/2018 |
| WO | 2020229274 | A1 | 11/2020 |

OTHER PUBLICATIONS

International Search Report and Written Opinion mailed Aug. 31, 2022 in related/corresponding International Application No. PCT/EP2022/064321.
Office Action created Feb. 9, 2022 in related/corresponding DE Application No. 10 2021 003 076.1.

* cited by examiner

METHOD FOR COMMUNICATION OF AT LEAST ONE MOBILE DEVICE WITH A MOBILE NETWORK BASE STATION, AND VEHICLE

BACKGROUND AND SUMMARY OF THE INVENTION

Exemplary embodiments of the invention relate to a method for communication of at least one mobile device with a mobile network base station, as well as to a vehicle with at least one mobile device.

The 3rd Generation Partnership Project (3GPP) is a worldwide cooperation of standardization bodies for the standardization in mobile communications. The 3GPP creates technical specifications describing all aspects of mobile technology so precisely that mobile devices from different manufacturers function with all mobile networks worldwide error-free. The mobile standards defined here are, for example, GSM, UMTS or LTE. The mobile standards are also referred to as 2G, 3G and 4G. Due to ongoing developments, it is also possible to transmit comparatively large amounts of data, for example via the recently introduced mobile telecommunications standard, 5G. Due to advances in research and the introduction of future technologies such as 6G, 7G or subsequent mobile standards, a further increase in the data rate transmitted via mobile communications is to be expected.

The transmission of data therefore requires the presence of sufficient radio signal strength. An increase in the distance of a mobile device from a transmitting station increasingly weakens this mobile signal until the mobile signal is too weak to transmit large data streams. Obstacles, such as high-rise buildings, bridges, hills, or trees, as well as sources of interference, for example sources of electromagnetic radiation such as transformers, located in the region between the mobile device and base station, can also affect the mobile signal.

To guarantee successful communication between the mobile device and the base station whilst the mobile signal is comparatively weak, 3GPP has introduced what is known as coverage enhancement. It is possible, by means of coverage enhancement, to exchange comparatively low data rates securely and reliably over a comparatively large geographic distance with a comparatively weak mobile signal. The data is therefore transmitted at a comparatively low transmission power, whereby little power is consumed. For the implementation of coverage enhancement, a corresponding base station must have special transmitting and receiving hardware for each mobile device. coverage enhancement can for example be implemented via LTE-M, LTE-MTC or LTE-Cut-M or also by newer standards such as LPWAN or NB-IoT.

The increased range using coverage enhancement is based on transmitting the same data multiple times. The weaker a mobile signal between a mobile device and base station, the more repetitions are necessary in order to ensure successful data transmission between the two communication participants. The renewed transmission of the same data takes up the available bandwidth, which is one reason for the only comparatively low data rate which can be transmitted. Therefore, coverage enhancement is only suitable for applications in which comparatively little data or a low data rate must be reliably transmitted even in the case of poor reception.

Such applications can be found in the automotive industry. Due to increased digitalization, vehicles are also being increasingly networked and are then able to exchange data with other vehicles via a vehicle-to-vehicle interface, to exchange data with infrastructure, such as for example a toll station, via a vehicle-to-infrastructure interface, or to transmit information via mobile communications via a vehicle-to-network interface. If such a communication-capable vehicle drives into a dead zone on a route, information might not be able to be transmitted via a conventional mobile radio standard, such as LTE or 5G, as the receiving quality is too poor. However, with the help of coverage enhancement, a successful communication between the mobile device and mobile network base station can be secured over larger distances.

However, based on the reduced data rate, only selected information can be transmitted. For example, the following information can be considered for communication using coverage enhancement due to its relevance: vehicle status updates, an unlock or lock command to open or close vehicle doors, and/or vehicle diagnostic data.

WO 2018/213166 A1 discloses a method for monitoring radio signal quality during the use of coverage enhancement. A coverage enhancement Level is changed using the method described in the document in such a way that a data rate necessary for the implementation of coverage enhancement is adjusted optimally to a current available receiving signal strength. If a mobile device moves away from a mobile network base station, a high coverage enhancement Level is selected, which is associated with a high repetition rate of a mobile signal to be transmitted. However, if the mobile device moves closer to the mobile network base station, a comparatively low coverage enhancement Level is selected, which is connected with a lower data repetition rate. Therefore, network communication resources can be conserved and therefore used optimally.

Exemplary embodiments of the present invention are directed to an improved method for communication of at least one mobile device with a mobile network base station in which efficient and energy-optimized communication of the communicating participants is enabled.

In a method for communication of at least one mobile device with a mobile network base station of the type mentioned in the introduction, according to the invention, if there is a demand situation, the mobile device activates a coverage enhancement mode in which the mobile device exchanges information with the mobile network base station using coverage enhancement and in a normal situation which differs from the demand situation, the mobile device ends the coverage enhancement mode.

The method according to the invention enables a particularly efficient and energy-optimized communication between the mobile device and the mobile network base station. For example, the simultaneous operation of a standard mobile connection and the maintenance of a mobile communication taking place via coverage enhancement requires a comparatively large amount of energy. If the mobile device is located so near to a mobile network base station that there is a comparatively high receiving signal strength between the two communication participants, maintaining the coverage enhancement mode is not required, as the data to be transmitted between the two communication participants can be transmitted via a conventional mobile radio standard, such as for example UMTS, LTE or 5G. Thus, to maintain the mobile communication via coverage enhancement, power is unnecessarily consumed. Due to the deactivation of the coverage enhancement mode in such a normal situation, the mobile device saves power through the reduction of energy usage. If the receiving signal quality between the mobile network base station and the mobile device has weakened to such a degree that relevant data cannot be exchanged via a conventional mobile signal standard anymore, communication between the two communication participants is ensured by using coverage enhancement in the coverage enhancement mode.

According to an advantageous embodiment of the method according to the invention, this demand situation is provided when:

the strength of a mobile signal between the mobile device and the mobile network base station falls below a specified minimum value over a specified time period;

the mobile device receives a demand indicator sent via mobile radio;

at a predicted location of the mobile device, there is not any or insufficient mobile signal available for a normal operating mode; and/or making an emergency call is not possible in the normal situation.

With the aid of the demand situation previously described, coverage enhancement can be activated in a focused and therefore energy-efficient manner. For example, if the mobile device is moving through a dead zone, it is expected that the mobile signal between the mobile device and mobile network base station will only be below the specified minimum value temporarily, for example a suitable value for communication via a common mobile signal standard, which makes the activation of coverage enhancement superfluous if in these short time periods no relevant data is to be transmitted. If, however, the dead zone is particularly large, or there is relevant data to be transmitted during the passage through the dead zone, coverage enhancement is activated for ensuring data transmission. A time span can be defined from which coverage enhancement is to be activated with the aid of the specified time period. This time span, or rather this time period, can be selected, for example, depending on an interval at which relevant data is to be transmitted.

A request can also be transmitted to the device to activate coverage enhancement, using the demand indicator. Thus, the mobile device can be put into the coverage enhancement mode in a particularly flexible and needs-based manner.

If a planned motion path of the mobile device is known, it can be checked whether there are any dead zones along this motion path. If such a dead zone is detected, possibly a dead zone that is so large that the specified minimum value of the mobile signal is undershot during the specified time period. Coverage enhancement can be activated early, for example at the beginning of the mobile device's movement. Coverage enhancement can also be activated at short notice, for example immediately before reaching such a dead zone. Here, for example, a minimum time value or rather a minimum distance before reaching the dead zone can be selected for the activation of coverage enhancement.

This ensures that a reliable mobile radio communication is possible between a mobile device and a mobile network base station at any time, as the communication connection between the mobile device and mobile network base station does not break off at any time.

In an emergency situation, it can also be necessary to make an emergency call via mobile communications. If this is not possible in a normal situation via a conventional mobile radio standard, coverage enhancement can be activated as needed to transmit the emergency call. This increases the probability that the emergency call will actually be transmitted and appropriate rescue measures will be initiated in time.

The activation of coverage enhancement can generally take place by the transmission of mobile communication parameters from the mobile network base station to the mobile device, or also by user-specific signaling in PHY/MAC/RRC/PDCP or similar, or also controlled on the application level.

According to another advantageous embodiment of the method, the output of the demand indicator is initiated by a manufacturer of the mobile device, a manufacturer of a device comprising the mobile device, and/or by a mobile network operator. Therefore, the manufacturer of the mobile device or rather the manufacturer of the device comprising the mobile device as well as the mobile network operator are able to put the mobile device in the coverage enhancement mode. A device comprising a mobile device may for example be a vehicle. Thus, the manufacturer of the device may be a vehicle manufacturer.

If the vehicle manufacturer does not receive, for example, any relevant data from a particular vehicle over a longer time period, the vehicle manufacturer can send the demand indicator to the corresponding mobile device of the vehicle when the communication connection is sufficiently stable again. Thus, the mobile device of the vehicle is put in the coverage enhancement mode, whereby a more reliable communication between the mobile device and vehicle manufacturer is enabled.

A further advantageous embodiment of the method further provides that artificial intelligence is used to check if there is a situation that requires the output of the demand indicator. The use of artificial intelligence, such as for example artificial neural networks, makes it possible to particularly reliably recognize a situation that requires the initiation of the demand indicator. For example, artificial intelligence can monitor communication taking place between a mobile device and mobile network base station and after detecting specific patterns, for example in a receiving signal strength, can detect the presence of a demand situation. Thus, the artificial intelligence can be used by the manufacturer of the mobile device or device comprising the mobile device or the mobile network operator. Overall, it is also possible that the artificial intelligence is implemented on the mobile device or on a computing unit of the device comprising the mobile device. Thus, the mobile device itself and/or the computing unit can output the demand indicator.

According to a further advantageous embodiment of the method, the mobile device only activates the coverage enhancement mode after receiving the demand indicator if the initiator of the demand indicator is authorized to activate the coverage enhancement mode. This prevents coverage enhancement from being activated by third parties, unauthorized users, for example an attacker such as a hacker or also a server transmitting the demand indicator to the mobile device on the basis of misidentification.

A further advantageous embodiment of the method provides that an identifier of the initiator is stored in the mobile device in order to classify this initiator as authorized to activate the coverage enhancement mode. With the aid of the identifier it is particularly easy to check whether the initiator of the demand indicator is authorized. The identifier can be, for example, IMSI, IMEI, MSISDN, ICCID, SPID value or similar. Therefore, the identifier can be transmitted together with the demand indicator to the mobile device. The identifier can also be provided on the mobile device before the transmission of the demand indicator to the mobile device, for example during the delivery or production of the mobile device. For this purpose, the identifier can be saved on a storage unit, such as a volatile or non-volatile storage medium of the mobile device or the computing unit.

Preferably, the demand indicator is transmitted via satellite or drone-based telecommunications. Here, drone-based telecommunication is understood as meaning a mobile network produced by at least one drone or a drone swarm. Any mobile technology such as 2G to 5G or also future mobile standards or also WIFI or similar wireless technologies are used via at least one satellite and/or at least one drone. The use of satellites and/or drones enables comparatively poorly served regions of the earth to be covered with a mobile phone network.

In a vehicle with at least one mobile device, according to the invention, the mobile device is equipped to carry out an aforementioned method. The vehicle can be any vehicle such as a car, lorry, van, bus or similar. The vehicle can comprise one or also multiple mobile devices. This can be permanently integrated in the vehicle, or also be transported with the vehicle, for example in the form of a mobile terminal such as a smartphone or similar. By providing such a mobile device in a vehicle, for example vehicle diagnostic data, vehicle status updates or similar can be transmitted from the vehicle to a vehicle manufacturer, even if a mobile signal is too weak for the transmission of data, according to a mobile standard such as 2 to 5G or similar. A reliable data transmission is enabled with a comparatively low data rate with the aid of coverage enhancement. For example, the vehicle can receive a command to unlock or lock the vehicle doors via the mobile device, even with poor mobile network coverage.

According to an advantageous embodiment of the vehicle, the mobile device is designed as a vehicle telecommunications unit.

Preferably, the mobile device is equipped to activate or end the coverage enhancement mode:

while driving;

while at a standstill;

in the case of locked vehicle doors; and/or from a stand-by mode.

The mobile device is thus able to activate or end the coverage enhancement mode in different driving situations. Furthermore, the mobile device can wake the vehicle itself or at least a computing unit of the vehicle, such as a control device of a vehicle subsystem, from a stand-by mode.

Further advantageous embodiments of the method according to the invention and the vehicle also result from the embodiments which are described in more detail below with reference to the figures.

BRIEF DESCRIPTION OF THE DRAWING FIGURES

Figure 2:
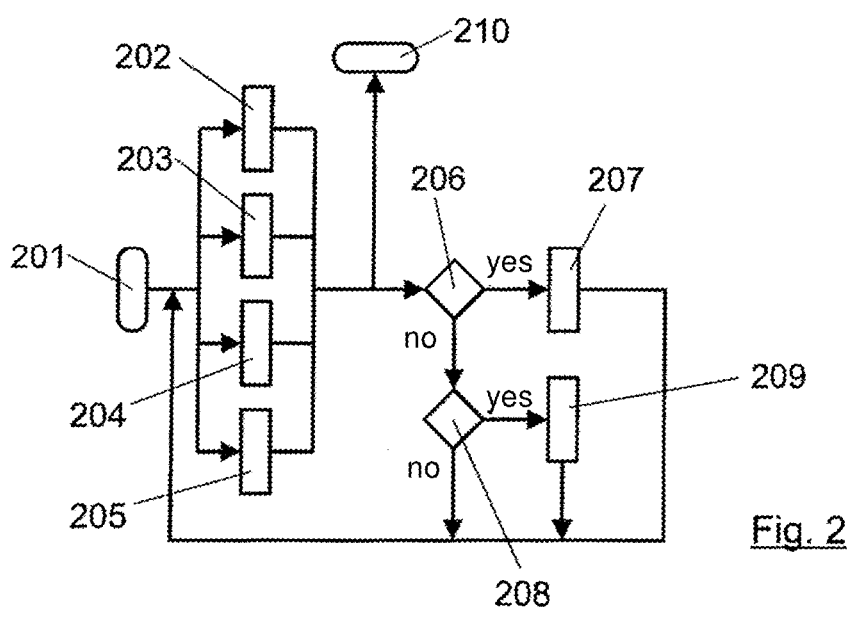

In the figures:

FIG. 1 shows a schematic top view of a vehicle's route along which the mobile signal strength differs; and FIG. 2 shows a flow chart of a method according to the invention.

DETAILED DESCRIPTION

FIG. 1 shows a top view of a vehicle 3 that travels along a route 5 through a transmission region 9 with different mobile network base stations 2. A mobile network base station 2 can be, for example, a terrestrial ground control 6, a satellite 7, and/or drone 8. Transmission regions 9 generated by the different mobile network base stations 2 can overlap partially of completely. On a partial section of the route 5 driven by the vehicle 3, there is a dead zone 10, highlighted in FIG. 1 by a shaded area, at which a mobile signal is so weak that communication with the mobile network base stations 2 is not possible via proven mobile standards such as 2 to 5G or also future mobile standards such as 6G or similar. Instead of, or in addition to mobile communications, another type of wireless technology can be used for the data transmission in a transmission region 9, such as for example broadcasting or WIFI.

The vehicle 3 comprises at least one vehicle telecommunications unit 4, at least one computing unit 11, and at least one sensor 12 for the implementation of vehicle diagnostics. Sensor data produced with the sensor 12 is processed on the computing unit 11 and transmitted via the vehicle telecommunications unit 4 by mobile communications to a mobile network base station 2. The data transmitted to a mobile network base station 2 can then, for example, be transmitted via the internet to a vehicle manufacturer, so that the vehicle manufacturer evaluates the data or processes it in some other way. Generally, the vehicle 3 can also have multiple vehicle telecommunications units 4 or other mobile devices 1, for example in the form of a mobile terminal device 13, such as a smartphone.

If the vehicle 3 approaches a first range 14.1 of a mobile network base station 2, a data transmission by a mobile device 1 is not possible any more by means of conventional mobile standards, as a mobile signal used for data transmission is too weak past the first range 14.1. Despite that, if the vehicle 3, or the computing unit 11 and/or the mobile device 1 requires the transmission of relevant data, a demand situation is present in which, according to the invention, the mobile device 1 is switched into a coverage enhancement mode, in which data is exchanged using coverage enhancement with a mobile network base station 2. For this purpose, a mobile network base station 2 has a second range 14.2 up to which data transmission is still possible using coverage enhancement. In the example in FIG. 1, such a second range 14.2 is only depicted for a terrestrial ground control station 6 on the left of FIG. 1. However, the other mobile network base stations 2 also have such a second range 14.2.

If the vehicle 3 enters the transmission region 9 served by satellites 7, there is no longer a demand situation that requires communication to be carried out based on coverage enhancement. In this case there is a normal situation in which the mobile device 1 switches into a normal operating mode in which the communication takes place again by using a proven mobile standard. Communication using coverage enhancement is then deactivated. Thus, the energy usage of the mobile device 1 and of the vehicle 3 reduces.

Due to the activation of coverage enhancement only during the demand situation, resources can be saved in the form of energy and thus communication bandwidth. Thus, a particularly efficient operation of the vehicle 3 is possible.

FIG. 2 shows a flow diagram of a method according to the invention. In a method step 201, the vehicle 3 starts and travels in the direction of a destination. In a method step 202, monitoring of a strength of a mobile signal between a mobile device 1, comprised by the vehicle 3, and a mobile network base station 2, which communicates with the mobile device 1 comprised by the vehicle 3, takes place.

In the method step 203, the vehicle 3, or the computing unit 11 and/or the mobile device 1 checks if a demand indicator is present which may have been received by the mobile device 1 in an optional method step that is not represented.

In the method 204, an analysis of the route 5 planned by the vehicle 3 is carried out, wherein network coverage on the route 5 is investigated for the presence of any dead zones 10. If it is necessary to transmit relevant data during travel through such a dead zone 10, this is a demand situation.

In the method step 205, the vehicle 3 emits an emergency call via a proven mobile standard, which, however, could not be received by a mobile network base station 2 based on an insufficient signal strength of the mobile signal. All or also some of the method steps 202 to 205 can be carried out consecutively and/or, as represented, simultaneously. Thus, some of the mentioned method steps are optional and thus can be omitted.

In the method step 206, the mobile device 1 or rather the computing unit 11 checks whether there is a demand situation. This means that the signal strength of the mobile signal falls below a specified minimum value over a specified time period, a demand indicator has been received by the mobile device 1, there is a dead zone 10 on the route 5, or there is insufficient mobile signal available for the normal operating mode, and/or transmission of an emergency call in the normal operating mode was unsuccessful.

If this is the case, in the method step 207, the coverage enhancement mode is activated for data transmission using coverage enhancement. If this is not the case, however, in the method step 208 it is checked whether communication between the mobile device 1 and mobile network base station 2 via a proven mobile standard exists or is possible again. In this case, in method step 209 the coverage enhancement mode is ended and the mobile device 1 switches back to the normal operating mode. In method step 210, the method is finished. This can, for example, be the case when the destination of the vehicle 3 is reached. However, it is also possible that the method according to the invention continues whilst the vehicle is parked. If the vehicle 3 is parked, for example, in a dead zone 10, communication with a vehicle manufacturer, for example, can be maintained.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for communication of a mobile device with a mobile network base station, the method comprising:

activating, by the mobile device if there is a demand situation, a coverage enhancement mode in which the mobile device exchanges information with the mobile network base station using coverage enhancement;

exchanging, in the coverage enhancement mode, at least one subset of information between the mobile device and the mobile network base station; and switching, by the mobile device, into a normal operating mode and ending the coverage enhancement mode in the normal operating mode, wherein the mobile device detects there is a demand situation based on receipt of a demand indicator via mobile communications, wherein the mobile device only activates the coverage enhancement mode when notified of the demand situation, after receiving the demand indicator, if the initiator of the demand indicator is authorized to activate of the coverage enhancement mode, and wherein the mobile device independently detects that there is a demand situation when the strength of a mobile signal between mobile device and mobile network base station falls below a specified minimum value over a specified time-span, when a navigation system determines a travel route for the mobile device, digital map material which contains location-specific information on mobile signal strength is stored in a database, and a comparison of the travel route of the mobile device with the digital map material shows that there is no mobile signal or insufficient mobile signal available for normal operating mode at a future location of the mobile device on the travel route, or it is not possible for the mobile device to make an emergency call in the normal operating mode.

2. The method of claim 1, wherein output of the demand indicator is initiated by a manufacturer of the mobile device, a manufacturer of a device comprising the mobile device, or by a mobile network operator.

3. A method for communication of a mobile device with a mobile network base station, the method comprising:

activating, by the mobile device if there is a demand situation, a coverage enhancement mode in which the mobile device exchanges information with the mobile network base station using coverage enhancement;

exchanging, in the coverage enhancement mode, at least one subset of information between the mobile device and the mobile network base station; and switching, by the mobile device, into a normal operating mode and ending the coverage enhancement mode in the normal operating mode, wherein the mobile device detects there is a demand situation based on receipt of a demand indicator via mobile communications, independently detects that there is a demand situation when the strength of a mobile signal between mobile device and mobile network base station falls below a specified minimum value over a specified time-span, independently detects that there is a demand situation when a navigation system determines a travel route for the mobile device, digital map material which contains location-specific information on mobile signal strength is stored in a database, and a comparison of the travel route of the mobile device with the digital map material shows that there is no mobile signal or insufficient mobile signal available for normal operating mode at a future location of the mobile device on the travel route, or independently detects that there is a demand situation when it is not possible for the mobile device to make an emergency call in the normal operating mode, wherein the mobile device only activates the coverage enhancement mode when notified of the demand situation, after receiving the demand indicator, if the initiator of the demand indicator is authorized to activate of the coverage enhancement mode, and wherein artificial intelligence is executed on a computing unit that monitors the communication of the mobile device with the mobile network base station, the artificial intelligence analyzes information exchanged between the mobile device and mobile network base station, and the artificial intelligence recognizes a situation requiring output of the demand indicator when the artificial intelligence recognizes characteristic patterns in the exchanged information.

4. The method of claim 1, wherein an identifier of the initiator is stored in the mobile device in order to classify the demand indicator initiator as authorized to activate the coverage enhancement mode.

5. The method of claim 1, wherein the demand indicator is transmitted via satellite or drone-based telecommunications.

6. A vehicle, comprising:

a mobile device configured to activate, if there is a demand situation, a coverage enhancement mode in which the mobile device exchanges information with the mobile network base station using coverage enhancement;

exchange, in the coverage enhancement mode, at least one subset of information with the mobile network base station; and switch into a normal operating mode and ending the coverage enhancement mode in the normal operating mode, wherein the mobile device is configured to detect there is a demand situation based on receipt of a demand indicator via mobile communications, wherein the mobile device is configured to only activate the coverage enhancement mode when notified of the demand situation, after receiving the demand indicator, if the initiator of the demand indicator is authorized to activate of the coverage enhancement mode, and wherein the mobile device is configured to independently detect that there is a demand situation when the strength of a mobile signal between mobile device and mobile network base station falls below a specified minimum value over a specified time-span, a navigation system determines a travel route for the mobile device, digital map material which contains location-specific information on mobile signal strength is stored in a database, and a comparison of the travel route of the mobile device with the digital map material shows that there is no mobile signal or insufficient mobile signal available for normal operating mode at a future location of the mobile device on the travel route, or it is not possible for the mobile device to make an emergency call in the normal operating mode.

7. The vehicle of claim 6, wherein the mobile device is a vehicle telecommunications unit.

8. The vehicle of claim 6, wherein the mobile device is configured to activate or end the coverage enhancement mode:

while driving;

while at a standstill;

in the case of locked vehicle doors; or from a stand-by mode.

* * * * *